(12) United States Patent
Baggio

(10) Patent No.: US 11,898,302 B2
(45) Date of Patent: Feb. 13, 2024

(54) ELEMENT FOR COVERING AN IRONING SURFACE

(71) Applicant: SIRETESSILE S.R.L, Cornuda (IT)

(72) Inventor: Gianfranco Baggio, Cornuda (IT)

(73) Assignee: SIRETESSILE S.R.L., Cornuda (IT)

( * ) Notice: Subject to any disclaimer, the term of this patent is extended or adjusted under 35 U.S.C. 154(b) by 324 days.

(21) Appl. No.: 17/414,977

(22) PCT Filed: Dec. 20, 2019

(86) PCT No.: PCT/IB2019/061191
§ 371 (c)(1),
(2) Date: Jun. 17, 2021

(87) PCT Pub. No.: WO2020/129004
PCT Pub. Date: Jun. 25, 2020

(65) Prior Publication Data
US 2022/0064849 A1 Mar. 3, 2022

(30) Foreign Application Priority Data

Dec. 21, 2018 (IT) .......................... 102018000020935

(51) Int. Cl.
D06F 83/00 (2006.01)
B32B 7/027 (2019.01)
(Continued)

(52) U.S. Cl.
CPC .............. D06F 83/00 (2013.01); B32B 3/08 (2013.01); B32B 3/266 (2013.01); B32B 5/02 (2013.01);
(Continued)

(58) Field of Classification Search
CPC .. D06F 83/99; D06F 81/003; D06F 81/00–14; B32B 7/027; B32B 7/12;
(Continued)

(56) References Cited

U.S. PATENT DOCUMENTS 2,214,824 A * 9/1940 Smith ..................... D06F 83/00
38/140
2,267,112 A 12/1941 Kovalik
(Continued)

FOREIGN PATENT DOCUMENTS

CN 2760092 Y * 2/2006
DE 29704672 U1 8/1997
(Continued)

Primary Examiner — Ismael Izaguirre
(74) Attorney, Agent, or Firm — Carmel Patent Agency; Robert J. Ballarini

(57) ABSTRACT

An element for covering an ironing surface includes: a first zone which comprises a multilayer which, in turn, comprises a first upper layer made of fabric, intended to be in contact with or in proximity to the garments to be ironed and/or of the iron, and a second underlying layer which is metallized, a second zone which comprises at least one layer made of thermally insulating material, so as to define a rest area for temporarily resting the heated plate of the iron and includes at the upper/outer surface of said second zone and/or at least another zone which is outside of said second zone, a print and/or a sign to indicate a time interval and/or a time value for which it is ensured that the heated plate of the iron can stop in the second zone without the plate itself damaging or deforming said second area.

20 Claims, 6 Drawing Sheets

(51) Int. Cl.
    *B32B 7/12*      (2006.01)
    *B32B 3/08*      (2006.01)
    *B32B 5/02*      (2006.01)
    *B32B 5/18*      (2006.01)
    *B32B 15/082*    (2006.01)
    *B32B 15/085*    (2006.01)
    *B32B 15/14*     (2006.01)
    *B32B 15/20*     (2006.01)
    *B32B 3/26*      (2006.01)
    *B32B 15/04*     (2006.01)
    *B32B 27/30*     (2006.01)
    *B32B 27/32*     (2006.01)

(52) U.S. Cl.
    CPC ............ *B32B 5/022* (2013.01); *B32B 5/18* (2013.01); *B32B 7/027* (2019.01); *B32B 7/12* (2013.01); *B32B 15/046* (2013.01); *B32B 15/082* (2013.01); *B32B 15/085* (2013.01); *B32B 15/14* (2013.01); *B32B 15/20* (2013.01); *B32B 27/306* (2013.01); *B32B 27/32* (2013.01); *B32B 2250/44* (2013.01); *B32B 2255/02* (2013.01); *B32B 2255/10* (2013.01); *B32B 2255/205* (2013.01); *B32B 2255/26* (2013.01); *B32B 2262/0261* (2013.01); *B32B 2262/0276* (2013.01); *B32B 2262/062* (2013.01); *B32B 2262/08* (2013.01); *B32B 2262/103* (2013.01); *B32B 2266/0278* (2013.01); *B32B 2307/202* (2013.01); *B32B 2307/304* (2013.01); *B32B 2307/306* (2013.01); *B32B 2307/73* (2013.01); *B32B 2307/744* (2013.01); *B32B 2571/00* (2013.01)

(58) Field of Classification Search
    CPC .. B32B 3/08; B32B 3/266; B32B 5/02; B32B 5/022; B32B 5/18; B32B 15/046; B32B 15/082; B32B 15/085; B32B 15/14; B32B 15/20; B32B 27/306; B32B 27/32; B32B 2250/44; B32B 2255/02; B32B 2255/10; B32B 2255/205; B32B 2255/26; B32B 2262/0261; B32B 2262/0276; B32B 2262/062; B32B 2262/08; B32B 2262/103; B32B 2266/278; B32B 2307/202; B32B 2307/304; B32B 2307/306; B32B 2307/73; B32B 2307/744; B32B 2571/00

See application file for complete search history.

(56) References Cited

U.S. PATENT DOCUMENTS

| | | | |
|---|---|---|---|
| 2,278,517 A * | 4/1942 | John | D06F 83/00 |
| | | | 38/140 |
| 2,298,927 A | 10/1942 | Callan | |
| 2,570,110 A | 10/1951 | Glatt | |
| 2,600,913 A | 6/1952 | Olson | |
| 3,636,644 A | 1/1972 | Janetzke | |
| 3,668,142 A | 6/1972 | Goodlow | |
| 3,733,724 A | 5/1973 | Davis | |
| 3,911,603 A * | 10/1975 | Lehrman | D06F 83/00 |
| | | | 38/140 |
| 4,186,489 A * | 2/1980 | Vigilante | D06F 81/00 |
| | | | 33/2 H |
| 4,360,984 A | 11/1982 | Ruttenberg | |
| 4,484,400 A * | 11/1984 | Lehrman | D06F 83/00 |
| | | | 38/140 |
| 4,849,044 A | 7/1989 | Siniscalchi | |
| 4,920,669 A | 5/1990 | Mattesky | |
| 5,259,131 A | 11/1993 | Mattesky | |
| 5,566,481 A | 10/1996 | Lehrman | |
| 7,299,573 B1 | 11/2007 | Kuncken | |
| D611,750 S * | 3/2010 | Bisher | D6/610 |
| 2013/0111787 A1 | 5/2013 | Areyur et al. | |
| 2014/0259328 A1 | 9/2014 | Maples et al. | |

FOREIGN PATENT DOCUMENTS

| | | | | |
|---|---|---|---|---|
| DE | 10022886 A1 * | 11/2001 | | D06F 83/00 |
| DE | 102010000379 B4 | 5/2013 | | |
| DE | 202014004202 U1 | 3/2014 | | |
| EP | 2166148 A1 | 3/2010 | | |
| GB | 2355305 A * | 4/2001 | | G01K 11/12 |
| GB | 2376743 A * | 12/2002 | | G01K 11/12 |
| IT | 1277721 A1 | 6/1997 | | |
| KR | 2007047009 A * | 5/2007 | | D06F 81/10 |
| NL | 1035968 B3 | 3/2010 | | |

* cited by examiner

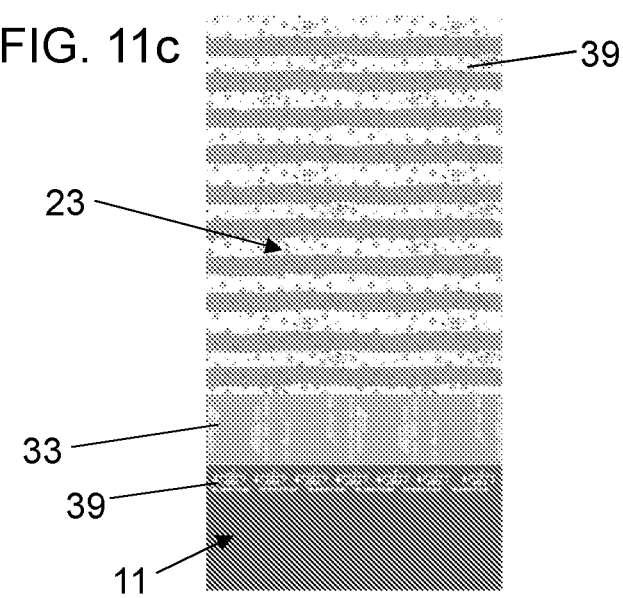
FIG. 11c
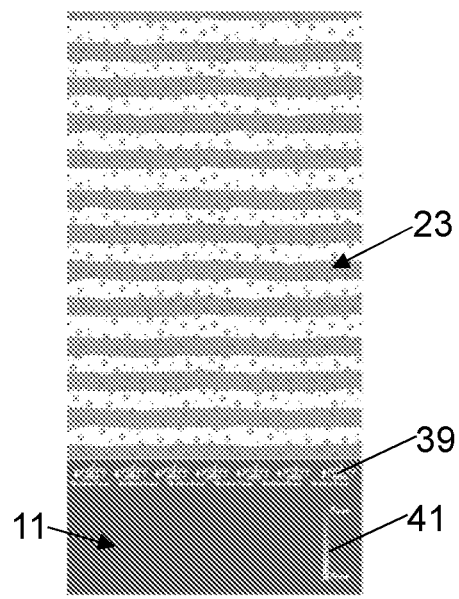
FIG. 11d
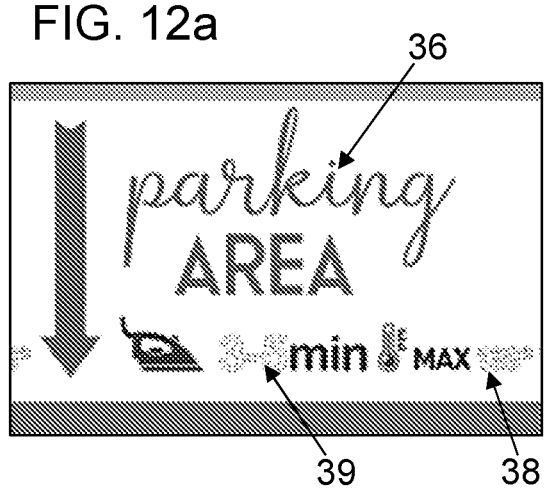
FIG. 12a
FIG. 12b
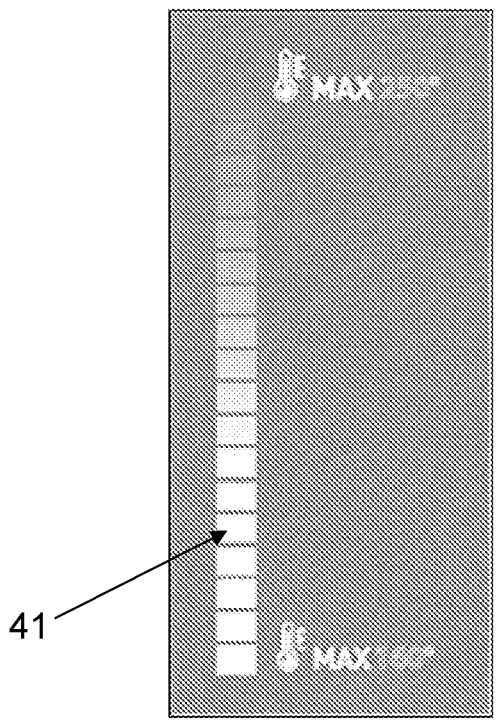
FIG. 13

ELEMENT FOR COVERING AN IRONING SURFACE

FIELD OF THE INVENTION

The present invention relates to an improved element for covering ironing surfaces, in particular of the type for covering ironing boards.

BACKGROUND

Below, for "cover element" or "cover plate" we specifically mean the element that covers and/or wraps around the ironing surface, and in particular the upper surface of the ironing board, and on which the clothing to be ironed and/or iron, thus excluding the additional accessories that are used to be positioned between this cover element and the surface/ironing board and that, therefore, do not result in direct contact with the garment to be ironed. In particular, the iron cover is used to cover an ironing board, and more precisely it is placed between the ironing board and the fabric to be ironed, so as to protect the ironing board from the heat and steam coming from the iron, and also make it easier to slide the iron on the surface, making the operation easier and safer.

Currently, the use of a multilayer consisting of an outer layer of fabric, one or more intermediate layers of flannel or rubber, for example in polyurethane foam, and an inner metallized layer is already known for making ironing covers. Such a multilayer is described for example in NL1035968 in which it is also provided that the metallized inner layer is supported at the bottom by a foam substrate.

Furthermore, IT1277721 (application No. MI1995A002751) describes a covering material for ironing surfaces formed by an outer upper layer of fabric, a first underlying intermediate layer of polymeric material, a second underlying intermediate layer consisting of a metallized film and a lower layer basic interior in a material selected from natural fiber melton, synthetic fiber fleece, polyurethane foam, expanded polyethylene or foamed PVC.

These known solutions are not completely satisfactory since, the heat produced by the iron generates a considerable production of humidity which is absorbed and stagnates inside the cover itself, thus causing an undesired wet effect even on the clothes to be ironed.

Not only that, but the currently known materials for making ironing board covers do not exhibit optimum heat reflection, therefore requiring greater energy consumption as well as an increase in ironing time.

Furthermore, the known cover plates are particularly thick, and this makes them particularly bulky, in particular when they are in a folded, non-use, condition.

U.S. Pat. No. 2,600,913 describes a covering element for ironing surfaces which proposes to quickly dissipate the heat to avoid damage and burns to the covering element itself. Said covering element comprises a fabric layer whose lower surface is sprayed with finely dispersed molten metal particles.

U.S. Pat. No. 4,849,044 describes a covering element for ironing surfaces which aims to have a high degree of thermal insulation. Said covering element comprises a fabric layer which has a surface coated with sticky plastic adhesives and whose opposite surface is covered with different non-sticky plastic additives; a layer of metallic particles dispersed in a polymeric matrix is subsequently applied to one or both surfaces of the aforementioned layer to generate a thermal barrier. This structure does not allow to obtain a waterproof covering element and the humidity generated by the ironing operation tends to pass through said covering element and to fall on the underlying surface; moreover, this structure does not allow to improve the smoothness of the iron during ironing operations.

DE 10 2010 000379 describes a cover element for ironing surfaces which aims to promote a uniform distribution of heat. Said covering element comprises an upper fabric layer and a lower layer consisting of a binder matrix in which mineral particles, preferably ceramic, are dispersed.

DE 297 04 672 describes a cover element for a washing machine or similar household appliance that is heat resistant and allows to use the upper surface of said washing machine or similar household appliance as an ironing surface. Said covering element comprises a fabric layer and a layer of felt or expanded material, in which one or both surfaces of the fabric layer can be metallized.

U.S. Pat. No. 4,360,984 describes a cover element for an ironing board which comprises an outer layer of cotton covered externally with a silicone resin in order to improve its resistance to temperature and to facilitate the sliding of the garment to be ironed; moreover, this outer layer in cotton is sewn to an underlying multilayer formed by a barrier layer for heat and humidity (for example in aluminized polyester) which in turn is glued to an underlying layer of polyester foam.

U.S. Pat. No. 7,299,573 describes a cover element for a washing machine which comprises a first outer layer in quilted and heat-resistant material and a second smoother inner layer. Both layers have the same thickness and length and are made with a thin film of a material that includes a metal, for example they are in aluminized cotton, and this in order to make the covering element reversible. Moreover, this covering element comprises a portion configured to house/park the iron when the latter is not in use and this portion is made of a double layer of the same material used to make the second smoother inner layer, for example it is made of metalized cotton. This solution, while providing a parking area for the iron, is however not entirely satisfactory since it does not allow to support the hot plate of the iron for long periods.

U.S. Pat. No. 3,636,644 describes a covering element for an ironing surface which comprises an ironing area, which is made of a thermally reflective fabric sheet, and an anti-burn structure on which the iron can be placed when it is hot. In particular, this structure is formed by a fiberglass fabric, or other heat-resistant fabrics, which is folded back on itself to form a sort of pocket inside which a compressible material resistant to burns is inserted for example in fiberglass. The structure is sewn to the sheet of thermally reflective fabric and protrudes above the rest of the covering element. In particular, at the junction area between the ironing area and the anti-burn structure, the sheet of thermally reflective fabric which defines the ironing area is suitably folded to protect the edges of said structure. However, this solution is not fully satisfactory since the covering element—and in particular the iron support/parking structure—is extremely complicated to realize and, moreover, the ironing area is not optimal as it absorbs and stagnates the humidity.

U.S. Pat. No. 2,267,112 describes a covering element for an ironing surface which comprises a support made of asbestos and sewn onto an underlying fabric layer. It is clear that this solution is in no way satisfactory since the use of asbestos is a danger to the health of the user.

U.S. Pat. No. 5,566,481 describes a cover element for an ironing board which comprises an ironing area formed by a padding externally covered with a fabric, and a structure (panel) on which the iron can be placed (parked) in a horizontal position. In particular, this structure has a panel of padding that is resistant to abrasion and burns and is laterally protected by a suitable bumper (which is formed by fabric folded on itself inside which a filling material is inserted). More in detail, the panel of padding resistant to abrasion and burns is sewn onto an underlying layer of fabric (which is the same as in the ironing area); moreover, only at the padding panel of the support/parking structure of the iron is an intermediate layer made of thermally insulating material, for example an aluminum foil, interposed between said panel and the underlying fabric layer. However, this solution is not fully satisfactory since the covering element—and in particular the iron support/parking structure—is extremely complicated to realize and, moreover, the ironing area is not optimal as it absorbs and stagnates the humidity.

SUMMARY

The object of the invention is to propose an element for covering an ironing surface that solves the aforementioned drawbacks present in traditional solutions.

Another object of the invention is to propose an improved element for covering ironing surfaces which allows to simplify the ironing operations, and which in particular makes ironing more convenient, easier and faster.

Another object of the invention is to propose an improved element for covering ironing surfaces, which reduces the heat and vapor reflected towards the operator during ironing.

Another object of the invention is to propose an improved element for covering ironing surfaces which allows a significant energy saving.

Another object of the invention is to propose an improved element for covering ironing surfaces that is easy to fold and has a particularly limited bulk when it is in the folded condition and is thus highly portable.

Another object of the invention is to propose an improved element for covering ironing surfaces, which avoids or at least limits the possibility of burning or damaging the element itself or the underlying support base.

Another object of the invention is to propose an improved element for covering ironing surfaces, which allows carrying out the ironing operations on all its surface, and in particular also on that prepared for temporarily parking the hot iron in a horizontal position.

Another object of the invention is to propose an improved element for covering ironing surfaces, which does not deform permanently as a result of exposure to the high temperatures of the ironing.

Another object of the invention is to propose an improved element for covering ironing surfaces, which avoids or reduces the risk of igniting a fire.

Another object of the invention is to propose an improved element for covering ironing surfaces, which avoids or reduces the risk of electric shock for the user.

Another object of the invention is to propose an improved element for covering ironing surfaces, which makes ironing operations easier.

Another object of the invention is to propose an improved element for covering ironing surfaces which can be applied quickly and easily to the support base and which, during ironing operations, remains immobile and stably connected to said base.

Another object of the invention is to propose an improved element for covering ironing surfaces which is alternative and improved with respect to the traditional solutions and in particular to the products currently on the market.

Another object of the invention is to propose an improved element for covering ironing surfaces which can be obtained simply, rapidly and at low cost.

Another object of the invention is to propose an improved element for covering ironing surfaces with an area for parking the iron in a horizontal position, which is particularly simple, rapid and inexpensive to make.

All of these objects, whether alone or in any combination thereof, and others resulting from the following description, are achieved, according to the invention, with an improved element for covering ironing surfaces as defined in the appended independent claim.

BRIEF DESCRIPTION OF THE DRAWINGS

The present invention is hereinafter further clarified in some of its preferred embodiments described for purely illustrative and non-limiting purposes with reference to the attached drawings, in which:

FIGS. 11a-d show in plane view the improved covering element in other graphical forms of embodiment, FIG. 12a, b shows corresponding examples of the prints applied on the upper/outer surface of the first zone and/or second zone and/or third zone, and FIG. 13 shows an example of a thermosensitive strip provided on the upper/outer surface of the first zone and/or second zone and/or third zone in order to indicate the temperature of the heated plate of said iron.

DETAILED DESCRIPTION OF THE PREFERRED EMBODIMENTS

Figure 1:
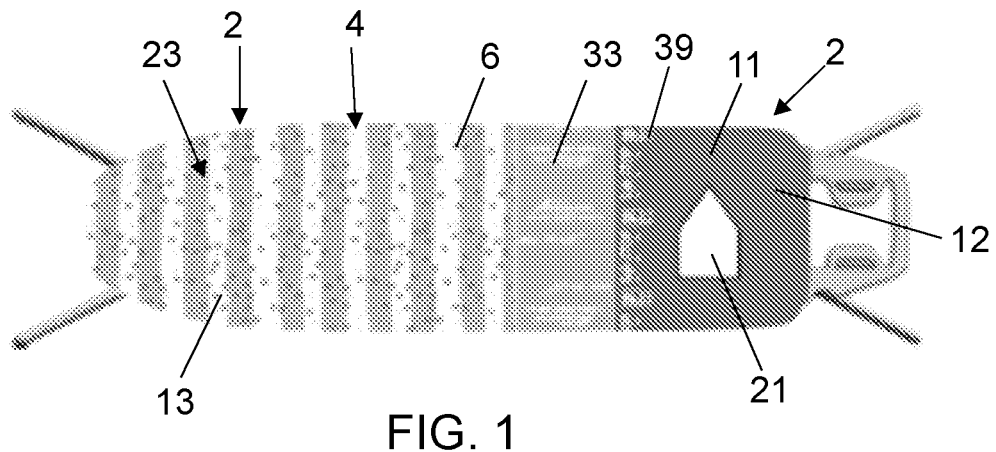
FIG. 1 shows in plan view the improved element for covering ironing surfaces according to the invention mounted on an ironing board.
Figure 2:
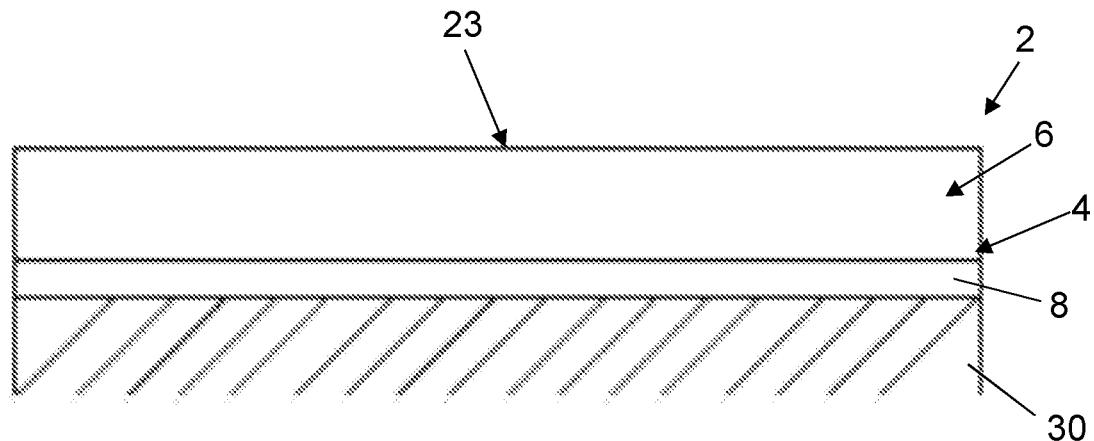
FIG. 2 shows in a schematic vertical section the improved covering element at a first area thereof.

Conveniently, it is understood that in FIGS. 2-10 the different layers are not shown in their actual proportions but are illustrated with fictitious proportions and intended to understand the present invention.

As can be seen from the figures, the improved element 2, according to the invention, of covering an ironing surface 30 (for example of an ironing board) comprises a first zone 23 which is made with a multilayer 4 which in turn is it comprises:
- a first fabric layer 6, intended to be in contact with the items to be ironed and/or the iron 21, and
- a second layer 8 which is metallized, preferably aluminized.

Advantageously, the element 2 has a substantially laminar conformation, i.e. its thickness is much lower than the other two dimensions.

Advantageously, the multilayer 4 has an overall thickness substantially less than 1 mm, preferably less than about 0.5 mm and, even more preferably, less than 0.35 mm.

In particular, in the multilayer 4, the first layer 6 is placed above/externally with respect to the second layer 8 of thermally reflective material, which therefore defines a more internal and lower/underlying layer to the first layer.

Advantageously, the second underlying layer 8 of the multilayer 4 is thermally reflective. Conveniently, the second metallized layer 8 allows to at least partially reflect the heat generated by the iron, with the double result of avoiding excessively heating the underlying ironing surface 30 and keeping warmer the item being ironed. Moreover, in the case of the use of a steam iron 21 the aluminum layer also allows the steam generated by the iron to be reflected, thus preventing wetting of the ironing surface 30 and creating a sort of air and steam cushion which facilitates the sliding of the iron, thus making the ironing operation simpler, more effective and therefore faster.

In particular, at least in said first zone 23 of the element 2 according to the invention, the upper surface of the first layer 6 of the multilayer 4 can be used for direct contact with the garment to be ironed and/or with the iron 21, while the lower surface of the metallized layer 8 can be destined to direct contact or to be closer to the upper surface 30 of the ironing board/base.

The first layer 6 of the multilayer 4 is associated with the underlying metallized layer 8 by lamination or spot or solid or powder coupling, preferably with polymeric glue and/or hot-melt resin (for example with reactive polyurethane), so as to guarantee a stable and long-lasting bond between the two layers and avoid any detachment or damage resulting from heat and/or steam generated by the iron 21 during use.

Conveniently, this type of coupling enables a multilayer 4 to be obtained which, without requiring further specific treatments, is smooth and uniform at the upper surface, on which the garments are intended to be placed, so as to facilitate the smoothness of the iron 21 during ironing, and at the same time prevents clothing from moving with respect to the ironing board during this operation.

Advantageously, the first layer 6 of the multilayer 4 is made of a fabric of natural fibers, preferably cotton, and/or polymeric fibers, for example of polyester. Preferably, the upper layer 6 is made of 100% natural cotton fabric or 100% polyester fabric or is made of a mixed cotton and polyester fabric. Advantageously, the upper fabric layer 6 is non-slippery, to prevent the clothes from moving with respect to the ironing board. Advantageously, the upper fabric layer 6 is sanforized.

Conveniently, the upper layer 6 is made of non-metallized fabric, and in particular the fabric is not covered or sprayed with metal particles.

Advantageously, the metallized layer 8 of the multilayer 4 comprises a metal film or sheet, preferably of aluminum, which faces towards the first layer 6. Preferably, said film or said sheet is continuous.

Preferably, the metallized layer 8 of the multilayer 4 can be composed of aluminum, copper or silver, or other metals having good heat reflection properties.

Advantageously, the metallized layer 8 of the multilayer 4, in particular when in the form of a foil, can be applied directly to the first layer 6, preferably by the use of glues, for example silicone resins, and preferably thermosetting resins.

Advantageously, the metallized layer 8 of the multilayer 4 can be deposited directly on the first layer 6 by chemical methods, for example as a solution by using colloidal suspensions of metal particles inside which the first layer 6 is immersed, or which can be sprayed onto the layer itself by nebulizers, or by physical methods, such as deposition by sputtering, or evaporation.

Advantageously, in one embodiment, the metallized layer 8 can consist only of said metal film or sheet, preferably of aluminum.

Advantageously, in another embodiment, the metallized layer 8 of the multilayer 4 can comprise a support substrate (not shown) which is coated at the top with a preferably continuous sheet of metal, preferably of aluminum. Suitably, the metal foil, preferably of aluminum, is associated by gluing to the supporting substrate.

Preferably, the metal film has a thickness substantially of the order of microns.

Advantageously, in another embodiment, the metallized layer 8 of the multilayer 4 can comprise a supporting substrate in which the metal, preferably aluminum, is sprayed (for example by "sputtering" deposition) or vacuum vaporized.

Preferably, the sprayed or vacuum vaporized aluminum has a thickness substantially between 10 nm and 1 μm.

Preferably, the supporting substrate is made of polymeric material, such as for example polyester (PL), polyamide (PA), polypropylene (PP), polyurethane (PU), polytetrafluoroethylene (PTFE), expanded polytetrafluoroethylene (ePTFE) and/or other similar materials.

Advantageously, the metallized layer 8 of the multilayer 4 can be colored by painting or by using a solid solution to obtain a different optical effect than that of the simple aluminum foil.

Advantageously, the metallized layer 8 can comprise a plurality of through openings which pass through the layer from side to side. Conveniently, the through openings comprise holes which are formed by passing through the metallized layer 8, preferably with wedge-shaped, solid or hollow cylinders, or by traditional shearing. Conveniently, the through openings comprise discontinuities, preferably microscopic gaps, present between the metal particles (preferably aluminum) which has been applied by spraying or by vacuum vaporization.

Advantageously, the method for making the multilayer 4 is as follows. Conveniently, the first layer 6 and the second layer 8 are coupled by calendering or rolling, preferably by interposing an adhesive glue between them.

The adhesive resin, preferably polyurethane, is suitably heated to a temperature ranging from 80° C. to 140° C., preferably from 100-120° C., and is then spread on the lower surface of the first layer 6 and/or on the upper surface of the inner metallized layer 8. Next, the two layers 6 and 8 are then moved closer together and joined together at the surface coated with the glue. Then, the assembly formed by the two layers 6 and 8, joined together, then passes into a calender having a working pressure which is suitably controlled so as to cause a temporary and localized reduction of the overall thickness of the assembly being formed. In particular, the working pressure of the calender must be appropriately controlled since, in the case of insufficient pressure, the proper bonding and the consequent stable and permanent coupling of the two layers 6 and 8 would not be obtained.

Advantageously, the calendering of the coupled formed by the first fabric layer 6 and the metallized layer 8 makes the upper surface of the first layer 6 particularly smooth and uniform, without the use of any chemical treatment.

Advantageously, the covering element 2 is configured to wind up, completely or partially, the upper base of the ironing surface 30, such as for example the upper base of an ironing board. Conveniently, the covering element 2 is used so as to be in direct contact with the upper base of the ironing board 30 without the interposition of further accessories or materials.

Advantageously, the improved cover element 2 defines a cover plate to be applied on an ironing board 30.

Advantageously, the covering element 2 is a cover plate, which has a shape suitable to be inserted in the ironing board so as to completely adhere at the upper base of this. Preferably, the cover plate has a substantially pointed, rounded or blunt end while the other end has a substantially square section.

Advantageously, the covering element 2 according to the invention also comprises one or more elastic edges and/or cords to fix the element 2 to the ironing board. Conveniently, the elasticated edges and/or the cords are bound to the multilayer 4 by lamination, sewing and/or heat-sealing.

Advantageously, the covering element 2 can be subjected to a traditional antibacterial treatment with biocides (for example by means of the technology said Sanitized®) or permanent bacteriostatic without biocides, for example by means of the technology said Abatox®. Conveniently, this allows an important antibacterial and/or bacteriostatic action which is useful above all for those who use the element itself sporadically.

Figure 3A:
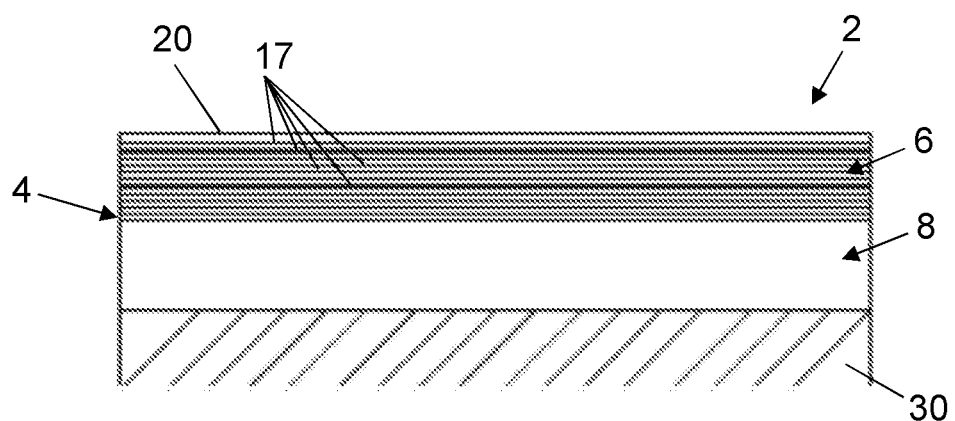
FIG. 3a shows in a schematic vertical section a first variant of the multilayer with which said element is made.
Figure 3B:
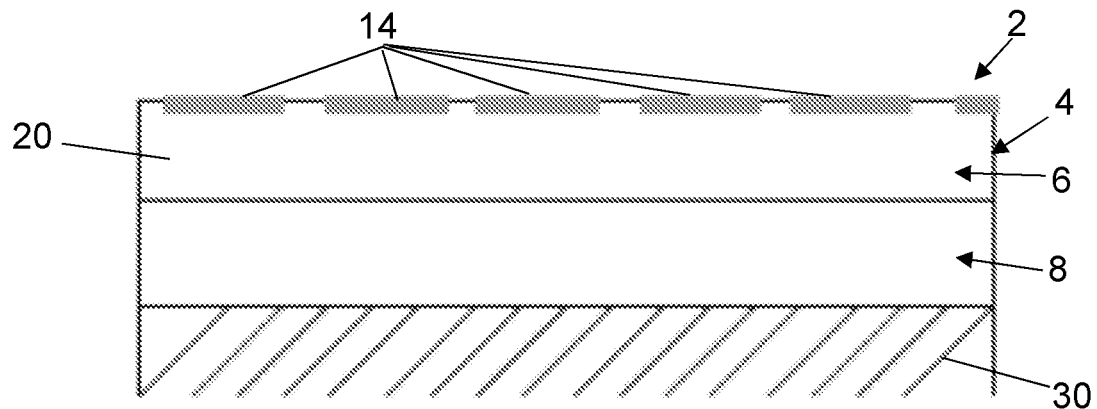
FIG. 3b shows in a schematic vertical section a second variant of the multilayer with which said element is made.
Figure 4:
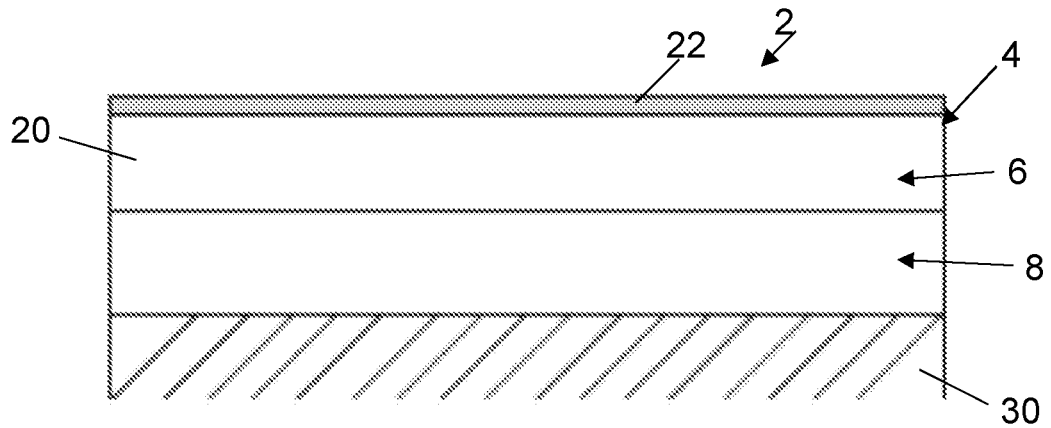
FIG. 4 shows in a schematic vertical section a third variant of the multilayer with which said element is made.
Figure 5:
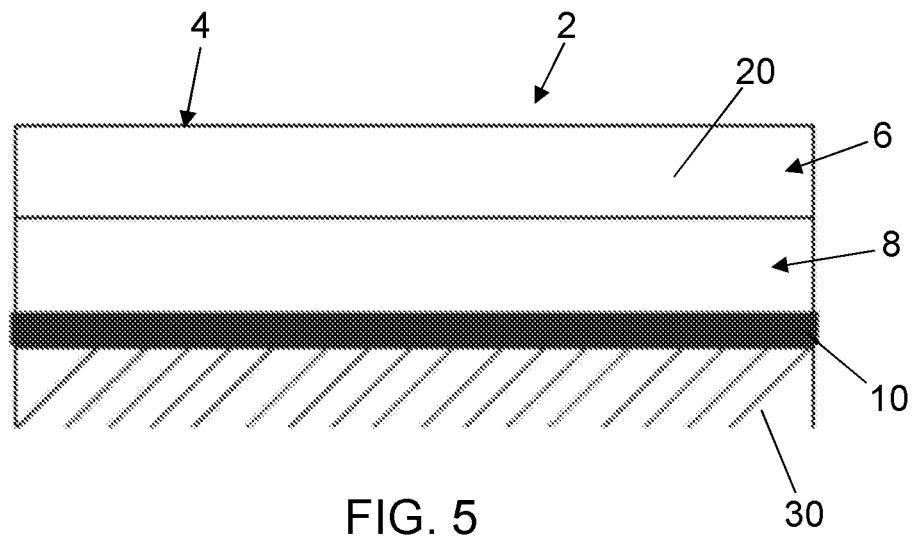
FIG. 5 shows in a schematic vertical section a fourth variant of the multilayer with which said element is made.

Advantageously, the first layer 6 of the multilayer 4—with which at least the first zone 23 of the element 2 is made—can be electrically conductive (see FIGS. 3A and 3B). Conveniently, this allows to avoid discharge problems due to the fact that the iron 21 power supply cable has a partially damaged sheath, for example due to contact with the hot plate, or in any case problems related to the static electricity that can accumulate by rubbing, in the case of ironing clothes for example made of synthetic materials, which are repeatedly rubbed against the element 2, particularly in the case of dry-pressing.

Conveniently, the first layer 6 of the multilayer 4 comprises a fabric 20 which is suitably made electrically conductive. Advantageously, the fabric 20 can be obtained with fibers of vegetable, animal or synthetic origin, preferably for example it can be in polyester, polyamide, wool, elastomer or cotton or also in mixed fibers with addition of metallic fibers (such as silver, copper, or other metal or carbon).

Advantageously, in a first variant (see FIG. 3A) of the first layer 6, the latter comprises a fabric layer 20 in which wires 17 made of electro-conductive material, such as carbon or silicon nanotubes, are inserted or used, whiskers of conductive materials, or, preferably, metal wires. Preferably, the wires 17 are made of aluminum, copper or silver, so as to ensure optimum thermal conductivity.

Conveniently, the fabric 20 of the first layer 6 can be of various types and, in particular, it can have various weights and, more in detail, it can be light (i.e. with a weight lower than 50 gr/m2) or heavy (i.e. with a basis weight higher than 200 gr/m2).

Advantageously, moreover, the electro-conductive wires 17 confer greater rigidity and resistance to the first layer 6, and therefore to the multilayer 4 in general.

Conveniently, the wires 17 are applied to the fabric defining a crossover weft and this in order to allow the wires 17 to touch each other across the entire surface extension of the fabric and thus obtain a conductivity over the entire surface extension of the first layer 6.

Advantageously, in a second variant (see FIG. 3B) of the first layer 6, the latter comprises a fabric 20 with printed electroconductive portions 14. In particular, an electroconductive print is applied to this first layer 6, preferably supplemented in graphite or a conductive metal. In particular, printing in electro-conductive material is obtained by depositing an electro-conductive material on the upper surface of the fabric, thus defining a plurality of surface tracks, preferably interconnected to each other. Suitably, this print on the fabric 20 is carried out by means of a textile printing technique and, in particular, it can be carried out by rotary printing with a cylinder, transfer printing, digital printing, frame printing, hand printing or machine printing.

Conveniently, the fabric 20 has a basis weight greater than 120 g/m2, and preferably higher than 130 g/m2 to allow adequate thermal and mechanical sealing during molding.

Advantageously, the electroconductive portions 14 can be suitably printed on the upper surface 13 of the fabric 20 so as to carry the logo or the name of the production company, or other symbols, decorations or textures.

The improved covering element 2 of the ironing surface 30 comprises along its surface extension:
  a first zone 23 which is made with said multilayer 4 comprising a first upper fabric layer 6, which is preferably intended to be in contact (or in any case closer together) with the clothes to be ironed and/or the iron 21, and a second underlying layer 8 which is metalized and preferably aluminized; conveniently, the second underlying metallized layer 8 is directly coupled to said first upper fabric layer 6 and comprises a film and/or a metal lamina facing towards said first layer,
  a second zone 11 which comprises at least one layer 12, preferably external, made of thermally insulating material to define a rest area to support, at least temporarily, the heated plate of the iron 21 (in particular to rest the iron in a horizontal position).

In particular, the thermally insulating material of said layer 12 of said second zone 11 is a different material than that present in said first zone 23. More in detail, said layer 12 of thermally insulating material is not constituted by the same metallized layer of the second layer 8 of said first zone 23. Preferably, said layer 12 of thermally insulating material is not metallized.

Advantageously, in said second zone 11, said layer 12 made of thermally insulating material can be provided in addition with respect to the layers of the first zone 23.

Suitably, the two zones 11, 23 are placed side by side with each other—preferably but not necessarily adjacent to each other—along the longitudinal or lateral development of the covering element (i.e. along the two directions which are perpendicular to each other and are also perpendicular to the thickness of the covering element). Basically, the two zones are arranged and develop one beside the other along at least one of the two larger dimensions of the covering element 2 with substantially laminar development.

Preferably, the thickness of the first 23 and the second zone 11 of the covering element 2 are substantially the same. In particular, preferably, the covering element 2 has a substantially constant thickness throughout its surface development.

Advantageously, the first zone 23 defines an area of the element 2 to be used operationally for the ironing, i.e. to rest the clothes to be ironed following the passage of the heated plate of the iron 21. Advantageously, the second zone 11 can also define it is an area of the element 2 to be used operationally for the ironing, i.e. to rest the items to be ironed. Conveniently, for this purpose, the outer surface of the first zone 23 and the outer surface of the second zone 11 are substantially coplanar. Preferably, moreover, the surface of the first zone 23 and the surface of the second zone 11 present a substantial continuity with respect to one another.

Conveniently, the second zone 11 could define a zone of the element 2 to be used only for the temporary stop of the iron 21.

Suitably, the thermally insulating material of said layer 12 of said second zone 11 can be configured to reflect or absorb and subsequently disperse the heat, which is generated by the heated plate of the iron 21, without undergoing drastic modifications in its conformation (melting, permanent deformation, appearance of cracks or other) and also avoiding modifications of the layers—underlying the said insulating material—present in said zone 11.

Preferably, the insulating material comprises a mineral paste, for example silica paste, aluminum or alumina paste, or other. Preferably, this paste is spread/applied on a fabric layer.

Conveniently, said second zone 11 is configured so that the heated plate of the iron 21, heated to the traditional temperatures of use of the iron itself, can stand for at least 30 seconds, and preferably for at least one minute, without the zone itself being subjected to permanent changes or modifications. In particular, the traditional temperatures of use of the iron are temperatures higher than 100° C. and, preferably, are between about 130° C. and 230° C.

Advantageously, the thermally insulating material of said layer 12 of said second zone 11 has good sliding properties, thus allowing—as mentioned—that said second zone 11 can be used for ironing operations. Advantageously, at the second zone 11, the element 2 can comprise a covering layer 12 and/or superimposed on the multilayer 4, in said thermally insulating material so as to define a rest area in which to rest, at least temporarily, the heated plate of the iron 21 without the heat coming from the plate itself damaging (for example burning it) or irreversibly deforming the said area; in particular, at the second zone 11, the iron 21 can be positioned substantially horizontally so that its heating plate is in direct contact with said zone, thus allowing a more stable positioning of the iron and thus reducing the risk of overturning it which can instead occur when the iron is placed vertically.

Preferably, the thermally insulating material of said layer 12 of said second zone 11 is not present (and does not extend) in said first zone 23.

Advantageously, the outer surface of the second zone 11 is substantially coplanar to the first zone 23 and, preferably, extends it with substantial continuity. Conveniently, this makes it possible to carry out the ironing operations also using the second zone 11.

Advantageously, the element 2 can comprise a third zone 33 comprising an external coating with a lubricating material to lubricate the plate of the iron thus rendering the ironing action smoother. Preferably, at the third zone 33, the multilayer 4 is coated at the top with a lubricating material to allow the iron 21 plate to be lubricated so as to "clean" it and make the ironing action smoother. Preferably, the third zone 33 also defines an area of the element that can be used by the user also for the ironing operations. Preferably, this lubricating material is silicone based.

Advantageously, the external surface of the third zone 33 is substantially coplanar with the second zone 11 and/or with the first zone 23 and, preferably, extends with a substantial continuity. Conveniently, this makes it possible to carry out the ironing operations also using the third zone 33.

Advantageously, the element 2 comprises a first zone 23, a second zone 11 in which it is possible to park the iron at least temporarily with the heating plate facing downwards, and a third zone 33. Preferably, the third zone 33 is interposed between the first zone 23 and the second zone 11 so that, once the iron 21 positioned in the latter is removed, the user must necessarily pass through the third zone 33 before ironing the garment resting on the first zone 23, thus allowing the plate of said iron to be lubricated.

Figure 6A:
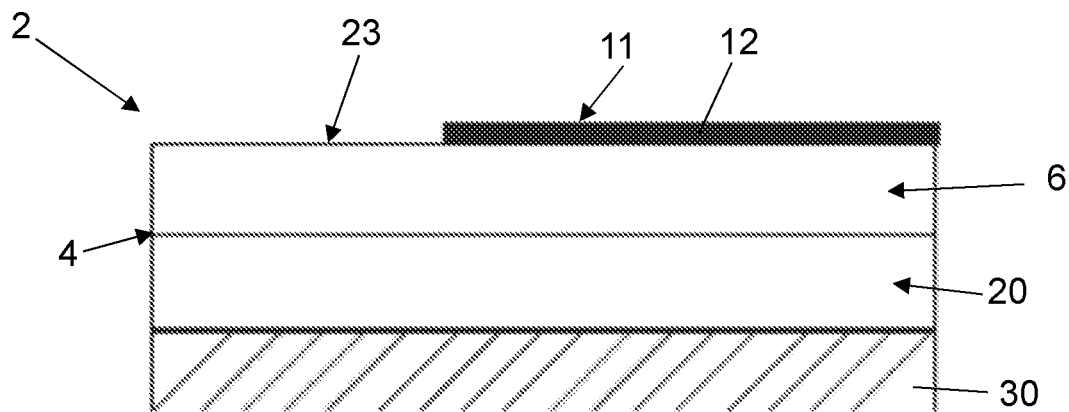
FIG. 6a shows in schematic vertical section, in correspondence with the first and the second area the improved covering element.
Figure 6B:
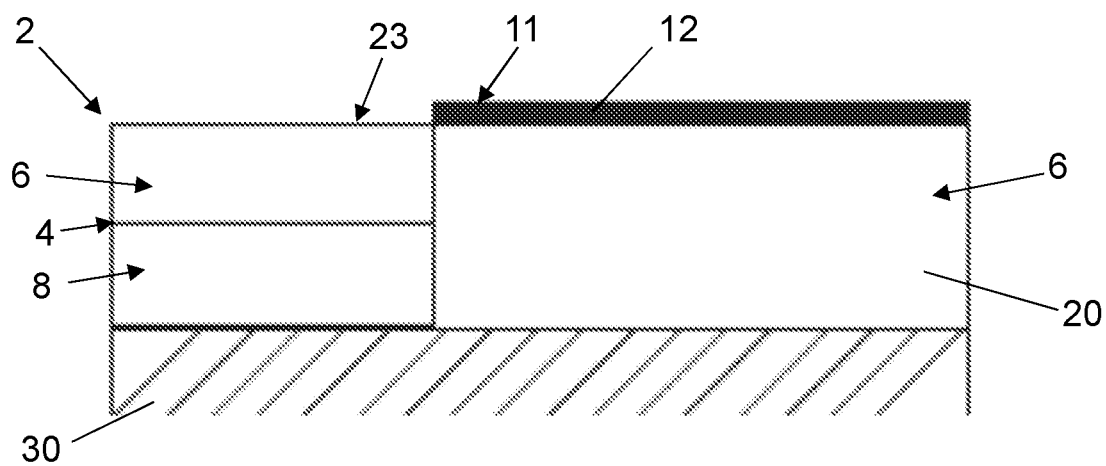
FIG. 6b shows in a schematic vertical section, in correspondence with the first and second area, a second embodiment of the improved element.
Figure 7:
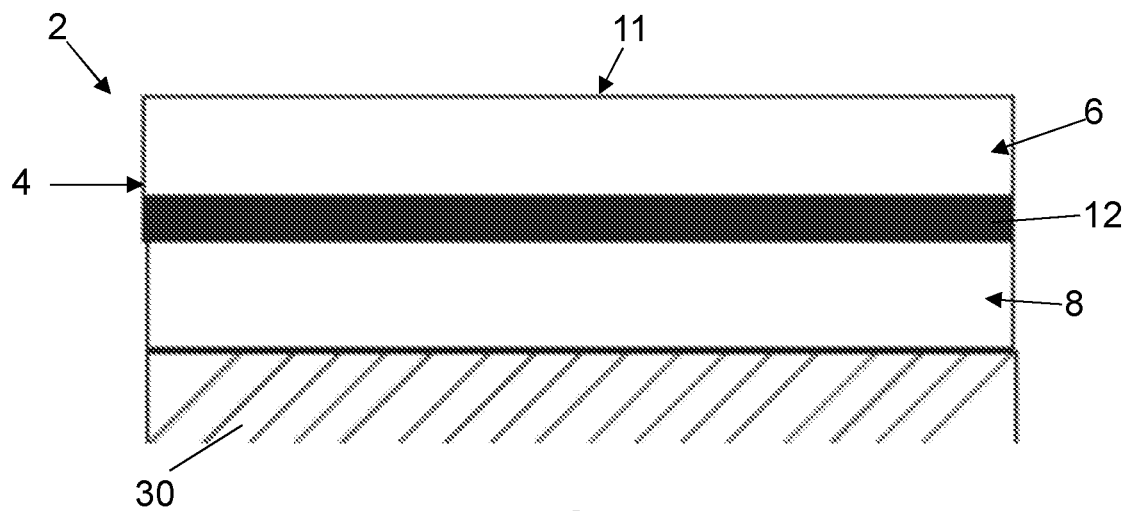
FIG. 7 shows schematic vertical section a further variant of the improved covering element at its second zone.

Preferably, the second zone 11 is defined at one end of the element 2, in particular at the square end of the ironing board (see FIGS. 1, 6A and 6B).

Conveniently, the layer 12 of the second zone 11 for resting the iron can comprise:
- a fabric made of aramid fibers, or
- a thermally stable insulating polymeric layer, for example made of PTFE, or other polymers, or
- a thin layer of ceramic material, or
- a fabric with threads covered by a thin layer of insulating material.

Suitably, the coating with the insulating material can be carried out with any known method for the deposition of thin films, for example by spraying the fabric with a solution of micro or nanoparticles of insulating materials, such as for example a refractory oxide (titania, silica, zirconia or other), or other refractory chalcogenides (metal sulfides such as zinc or other disulfide), dispersed in a volatile liquid, or by deposition with physical methods.

Preferably, said second zone 11 comprises, in addition to the outer layer 12, also the multilayer 4. Advantageously, in this case the multilayer 4 extends with continuity between the first zone 23 and the second zone 11. Advantageously, the layer 12 of material thermally insulation provided in the second zone 11 can be applied above the upper layer 6 in multilayer fabric 4 of which the entire surface development of the element 2 is constituted and, in particular, of which the first zone 23 of the said element 2 is constituted (see FIG. 6A). Conveniently, in this case, the multilayer 4 involves the entire surface development of the covering element 2 and, only at the second zone 11, is covered externally/superiorly by a layer 12 of thermally insulating material.

Alternatively, the second zone 11 can not comprising the multilayer 4.

Advantageously, the layer 12 of thermally insulating material provided in the second zone 11 can be externally covered by a further layer of fabric, preferably in a fabric resistant to high temperatures.

Advantageously, the layer 12 of thermally insulating material provided in the second zone 11 can be inserted between the upper layer 6 and the metallized inner layer 8 (see FIG. 7) so as to prevent the excessive heat caused by the iron 21 from melting or deforming the metallized layer 8. Advantageously, in this case this layer 12 of thermally insulating material can be made with heat-resistant polymers, such as for example poly-tetrafluoroethylene (PTFE), aramidic fibers or other materials, which can be suitably coated or in any case applied between the two layers, or can be glued to the lower surface of the upper layer 6 and to the upper surface of the metallized layer 8 by silicone glues or other gluing substances. Conveniently, this coupling can be realized by means of thermosetting resins, so as to prevent the heat of the iron 21 from dissolving the layer of glue.

Conveniently, in a further embodiment, at the second zone 11, a first thermally insulating layer applied externally and a second thermally insulating layer can be provided which, preferably, is inserted between the upper layer 6 and the metallized layer 8, so as to further protect the metallized layer 8 from the heat and steam coming from the iron 21.

Suitably, the second zone 11 can be prepared separately and then sewn or joined to the first zone 23 to thus form the element 2; in particular, in this case, at the second zone 11, the multilayer 4 is not provided and, in particular, no metallized layer 8 is provided (see FIG. 6B). More in detail, the layer 12 made of thermally insulating material of said second zone 11 can be associated with said first zone 23 by sewing.

Conveniently, the metallized layer 8 can be interrupted near the passage from the first zone 23 to the second zone 11 so as to allow the sewing of these with traditional methods of sewing between yarns and removing the need to use tools capable of perforating the aluminum, thus simplifying the production process.

Preferably the second zone 23 can be made by adding/applying the layer 12 of thermally insulating material on the outer surface of the first upper layer 6, thus allowing a substantial continuity of the multilayer 4 between the first 23 and the second zone 11. Advantageously, the second zone 11 may comprise—or may consist exclusively of—aramid fabric (for example Nomex® or Kevlar) which thus defines said thermally insulating layer and which is joined, preferably is sewn, to the first zone 23. Suitably, the second zone 11 thus formed defines a rest area to support the heated plate of the iron 21 for extremely long periods of time.

Preferably, the second zone 11 can comprise—or can consist exclusively of—elastic fabric resistant to high temperatures.

Conveniently, the second zone 11 has a different color than the remaining area of the element 2 and, in particular, with respect to the first operating zone 23 of the said element. Advantageously, on the outer/upper surface of the second zone 11 and/or outside (but in proximity) of the latter, a mark 36 (for example the parking symbol "P" or the wording can be printed or can be applied) "Park" or "parking") to indicate the intended use of that area.

Advantageously, moreover, on the outer/upper surface of said second zone 11 and/or of another area outside of said second zone 11 (i.e. on the first zone 23 and/or third zone 33) a print 39 or a sign can be applied (for example it can be sewn) to indicate the interval and/or the maximum time value (for example expressed in minutes) for which it is ensured that the heated plate of the iron 21 can rest in the second zone 11 without the plate itself damaging or deforming said area. In other words, if the heated plate of the iron 21 rest in the second zone 11 (that is, when the iron 21 is activated, with the heated plate, positioned horizontally) for a period of time equal to or less than said interval and/or value of time indicated by said sign, then surely said second zone 11 is not damaged (for example it is not burnt), deformed or irreversibly altered. Conveniently, said sign can define a number corresponding to the interval/limit value after which there is a damage or alteration, or it can define a number which—for safety—is less than the interval/limit value after which there is a damage or alteration.

Conveniently, this time interval and/or value can be indicated for one or more temperatures that can be reached by the heated plate of the iron 21. Advantageously, in addition to the printing and/or sign to indicate the time interval and/or value, it can be a further print 38 or a further sign (for example it can be sewn) can also be provided which indicates the corresponding temperature, in particular the maximum temperature (indicated by said further print 38 and/or sign), to which it is ensured that the heated plate of the iron 21 can stop, and for that determined interval and/or time value (indicated by said print 39 and/or sign), in the second zone 11 without the plate itself damaging or deforming said area.

Advantageously, moreover, on the outer/upper surface of said second zone 11 and/or of another zone outside of said second zone 11 (i.e. on the first zone 23 and/or third zone 33) a strip or an insert or, in general, a portion made of heat-sensitive material 41 and, in particular, configured so as to change color based on the temperature of the heated plate of the iron 21, thus allowing the user to be informed of the temperature of said heated plate.

Conveniently, the second zone 11 has a different surface printing or decoration with respect to the remaining area of the element 2 and, in particular, with respect to the first operative zone 23 of said element.

Advantageously, an anti-stain or oil and/or water-repellent treatment is performed at the upper/outer surface of the first zone 23 and/or of the second zone 11 and/or of the third zone 33. Advantageously, for this purpose, a further layer 22 of oil-and/or water-repellent material is preferably provided above the first layer 6 of the multilayer 4 (see FIG. 4).

Appropriately, the application of this further external layer 22 confers anti-stain and self-cleaning properties on the surface of the element itself, thus allowing the preservation of the element itself over time. Advantageously, this makes it possible to avoid soiling the clothes which are resting on said surface to be ironed and, in particular, it prevents the stain from being immediately "fixed" on the item ironed by the passage of the iron at high temperature.

Moreover, the further external layer 22 allows to improve the durability of the corresponding zone of the element 2, improving its conservation.

Advantageously, said further external layer 22 can be obtained by spraying with PTFE, also known as Teflon®. Alternatively, this further external layer 22 can be obtained by applying a super-hydrophobic protective layer, for example by depositing polymers, for example acrylic polyurethane, or other materials which have special nanostructures (in particular the presence of valleys and mounts separated in height by at least 100 nm and high density). Alternatively, said further external layer 22 can be composed of silicon-based polymers, or other composite materials provided, among other things, with lubricating properties.

Advantageously, at the inner/lower surface of the first zone 23 and/or of the second zone 11 and/or of the third zone 33, the covering element 2 can further comprise a further inner layer 10 (see FIG. 5) configured to increase the friction between the same element 2 and the ironing surface 30 under. Preferably, said further inner layer 10 is applied below and below the metallized layer 8 and gives a braking effect which substantially immobilizes the element 2 with respect to the underlying ironing surface 30.

Suitably, this is useful to avoid the presence of wrinkles, or folds in the element 2 which could then negatively affect the result of ironing, for example causing creases on the stretched garment, or making the movement of the iron 21 less smooth. Furthermore, this allows avoiding the sliding of the element 2 with respect to the surface below, avoiding unwanted operations to re-position the element itself.

Preferably, the further inner layer 10 can be made of rubber material and can be obtained by applying (for example by means of glues) a polymeric layer, for example polyethylene (PE) added with ethylene vinyl acetate (EVA) directly on the metallized layer 8, or a fabric layer can be used on which a rubber-effect printed with traditional methods has been applied.

Advantageously, the further inner layer 10 can be present on substantially the entire surface development of the element 2 or can only affect some areas thereof. Conveniently, in this second case, it is understood that the thickness of the further inner layer 10 is sufficiently thin so as not to cause depressions and bumps on the outer surface of the element 2.

Suitably, the localized application of the further inner layer 10 can use the repeated motifs, for example in rows or squares, to obtain a suitable distribution of the parts of the lower surface covered by the further inner layer 10 so as to confer a uniform braking effect and avoid localized sliding phenomena.

Figure 8A:
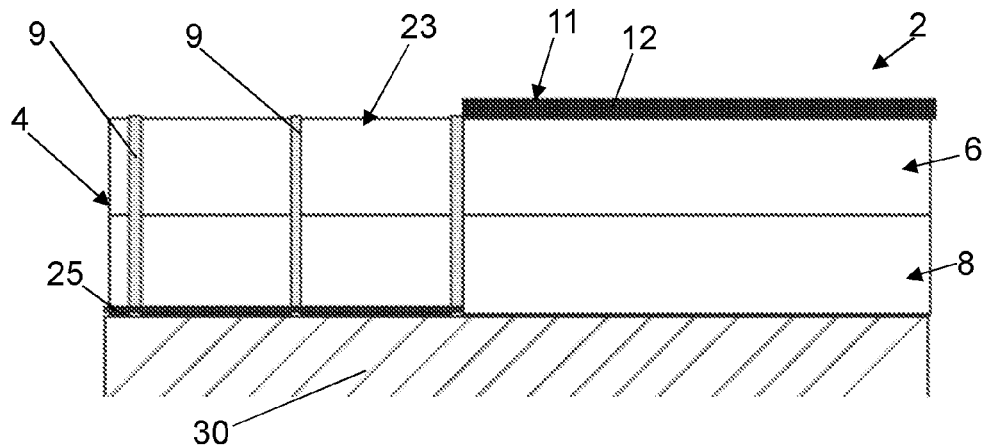
FIG. 8a shows a schematic vertical section, in correspondence with the first and second zones, a third embodiment of the improved element.
Figure 8B:
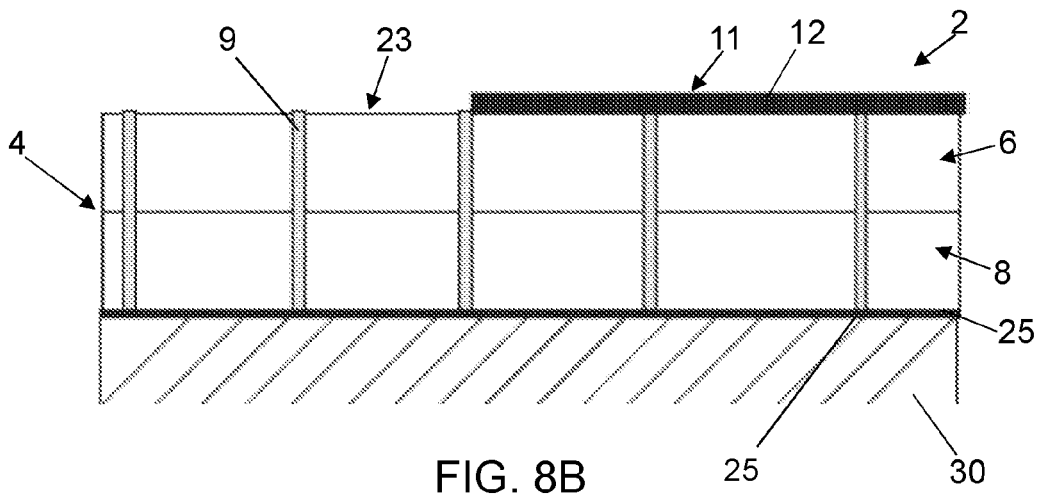
FIG. 8b shows in schematic vertical section, in correspondence of the first and the second area, a fourth embodiment of the improved element.

Advantageously, at least at the first zone 23 of the element 2—to reduce the reflection of heat and steam towards the upper surface and therefore towards the outside, which could be unpleasant for the operator who is ironing—the first layer 6, the metallized layer 8 and the other possible additional layers, intermediate or external, can have through holes 9 (see FIGS. 8a and 8b). Conveniently, the presence of the holes 9 allows the heat emitted by the iron 21 to pass through the element 2, thus allowing its dispersion and in particular reducing the reflection of the heat itself towards the upper surface of the element 2 and towards the operator.

Advantageously, in this case, an underlying continuous membrane 25 (i.e. not perforated), which is heat resistant, is associated at the bottom of the metallized layer 8. Conveniently, this membrane 25 protects the ironing surface 30 from heat and steam passing through the holes 9. Preferably, this membrane 25 is made of insulating material such as cork, wood fiber, glass fiber, ceramic or cotton, wool, polystyrene.

Conveniently, said holes 9 are not present in the zone 11, covered by the insulating layer 12, in which it is possible to rest the iron, so as to ensure a better insulation of the upper layer 6 and of the metallized layer 8 of this area.

Advantageously, the holes 9 are through holes, and bring the outer upper surface of the element 2 into communication with the ironing surface 30 or the underlying membrane. Conveniently, if the holes 9 are defined by an enlargement of the weft of the same fabric they can also be present under the insulating layer of the area in which it is possible to stop 11 (see FIG. 8b). This makes it possible to simplify the manufacturing process, since the layer 12 of insulating material can be deposited on top of the upper layer 6 without needing further passages.

Conveniently, the holes 9 are small, with a diameter of about 0.1 mm up to a maximum of 3-4 mm. Opportunely the holes 9 can have a density comprised between 3000 and 15000 holes per square meter.

Advantageously, the holes 9 can be distributed in a regular manner over the entire surface development of the element 2.

Suitably, the holes 9 in the fabric layers can be defined by the interspaces provided in the locally enlarged texture of the fabric itself.

Advantageously, the first zone 23 and/or the second zone 11 and/or the third zone 33 are externally glittered and this in order to define a particular aesthetic effect.

Figure 9:
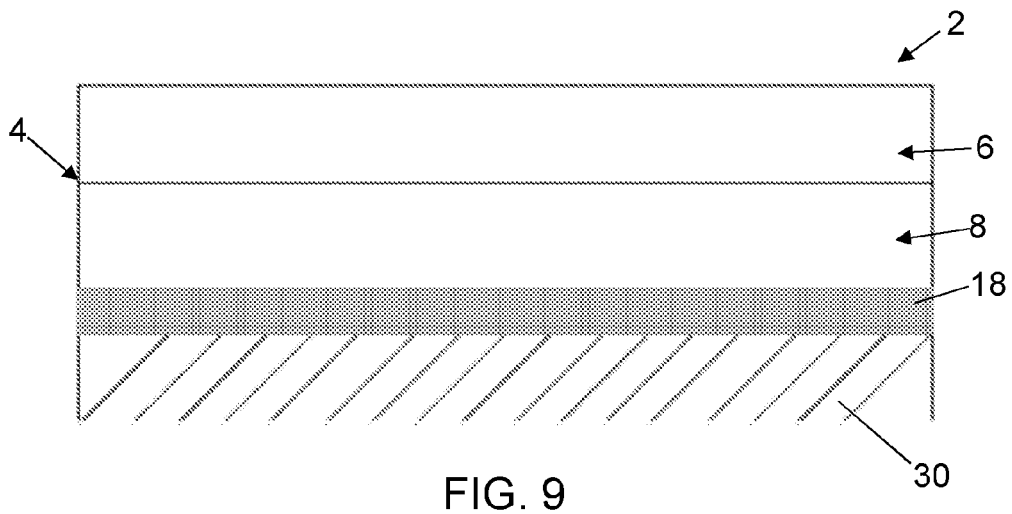
FIG. 9 shows in a schematic vertical section a fifth variant of the multilayer with which said element is made.
Figure 10:
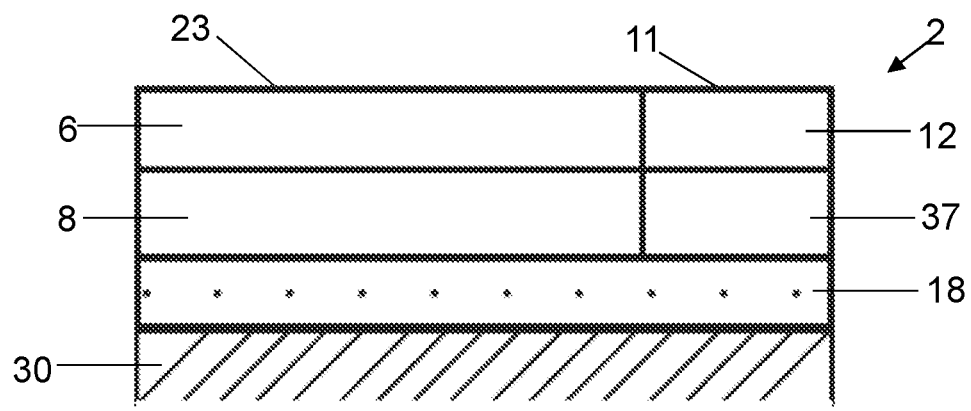
FIG. 10 shows a schematic vertical section in correspondence with the first and second area, a sixth embodiment of the improved element.
Figure 11A:
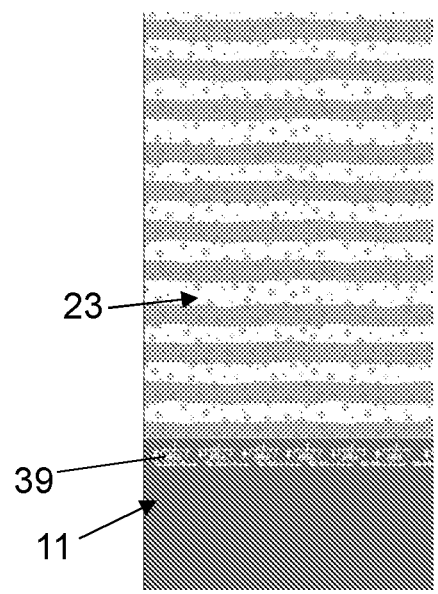
Figure 11B:
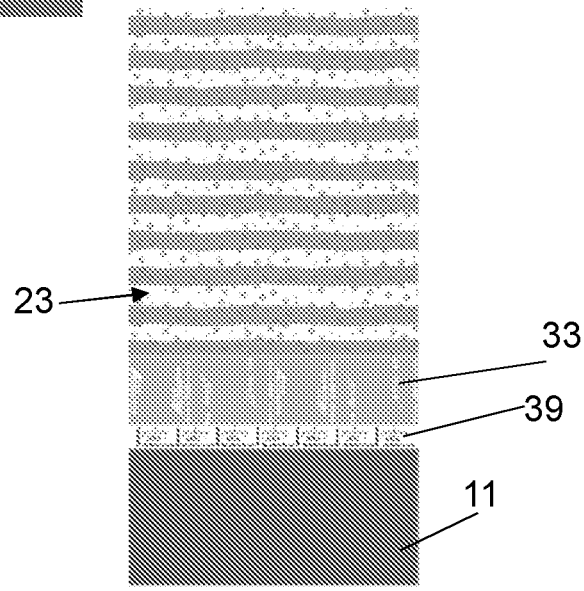

Advantageously, at the first zone 23 of the element 2 and/or also at the second zone 11 and/or the third zone 33, at least one underlying support layer 18 can also be applied (see FIG. 9). Conveniently, said at least one underlying support layer 18 is damping. Preferably, said support layer 18 is made of soft material, so as to prevent accidents such as blows or the fall of the iron 21 from damaging the surface, or in any case to make the ironing action more comfortable. Preferably, the support layer 18 is made of polymeric materials, for example polyester, or expanded polyurethane, and/or natural fabrics, such as felt or cotton. Preferably, said at least one support layer 18 can be constituted by:
  at least one layer of rubber, or
  at least one layer of felt, or
  a layer of rubber and one of felt.

Preferably, said at least one support layer 18 can be made of fleece or needle-punched fibers, preferably of polyester or polyurethane foam, and resistant to high temperatures (i.e. resistant to temperatures of about 200-250° C.).

Preferably, said underlying at least one support layer 18, which is intended to be in direct contact with the ironing surface 30, involves both the first zone 23 and the second zone 11.

Suitably, the support layer 18 is provided so as to be in contact with the ironing surface 30.

Preferably, at least at the first zone 23 of the element 2, said underlying support layer 18 is provided below the metallized layer 8 in contact with the ironing surface 30. Suitably, the support layer 18 can be applied to the element 2 by using polymeric glues, and preferably thermosetting resins.

Alternatively, and/or in addition the support layer 18 can comprise at least one layer of cloth, or of plush, in order to improve the cushioning effect of the element 2.

Suitably, the first zone 23 can consist of the multilayer 4 an underlying support layer 18. Alternatively, the first zone 23 may consist only of the multilayer 4.

Conveniently, the second zone 11 may be constituted by the layer 12 of thermally insulating material, the multilayer 4 and the support layer 18. Suitably, the second zone 11 can only consist of the layer 12 of thermally insulating material and of the support layer 18. Conveniently, the second zone 11 can be constituted only by the layer 12 of thermally insulating material and by the multilayer 4. Conveniently, the second zone 11 can be constituted exclusively from a fabric resistant to high temperatures (for example 50% of aramid fibers and 50% of fibers of viscose). Conveniently, the second zone 11 can consist exclusively of a fabric resistant to high temperatures (for example 50% of aramid fibers and 50% of viscose fibers) and of an underlying membrane/film 37 which, suitably, is impermeable, breathable and resistant to high temperatures (i.e. around 200-250° C.), for example in PTFE. Conveniently, the second zone 11 can consist exclusively of a fabric resistant to high temperatures (for example 50% of aramid fibers and 50% of viscose fibers) and of an underlying rubber resistant to high temperatures (for example in PTFE). Conveniently, the second zone 11 can consist exclusively of a fabric resistant to high temperatures (for example 50% of aramid fibers and 50% of viscose fibers) and an underlying layer of felt. Conveniently, the second zone 11 can consist exclusively of a fabric which is resistant to high temperatures (for example 50% of aramid fibers and 50% of viscose fibers) and of an underlying layer of rubber and felt.

Advantageously, the element 2 can be subjected to a flame retardant and/or fireproofing treatment, so as to avoid the spread of the flame which can be triggered if the user leaves the iron 21 laid outside the parking area. Suitably, the flame-retardant treatment is in itself traditional, and can comprise, for example:

- the interweaving with mixtures based on polyvinyl chloride (PVC) mixed with phosphoric esters,
- the interweaving with wires based on halogen-containing polymers,
- the impregnation with a solution containing soluble phosphorus-based salts, such as red phosphorus, or organic phosphorus-based compounds such as alkyl or aryl phosphates, or other phosphines,
- the impregnation with a solution containing organic nitrogen-based compounds, such as melamine,
- the impregnation with a solution containing antimony salts,
- the impregnation with a solution containing boron compounds, or the impregnation of the fabric with a powder of the compounds themselves,
- the impregnation with a powder based on magnesium carbonate.

Advantageously, the improved covering element 2 is impermeable.

It is understood that the embodiments described herein (see FIG. 2-9) can be suitably combined together in order to obtain a covering element 2, which meets the needs of the user.

From the foregoing it is apparent that the improved element, according to the invention, for covering an ironing surface is advantageous and in particular:

- it defines an extremely smooth and flat ironing surface with the external surface without requiring any additional speeding treatment, (such as, for example, silicone-based treatments),
- is suitable to be used both with steam irons and non-steam irons,
- allows a lower adherence of the iron and therefore greater smoothness of the latter during the ironing operation,
- in the first zone, since there is no intermediate layer, the metallized layer is closer to the iron, thus allowing a greater reflection of the heat produced by said iron, with a reduction in the ironing times and significant energy savings; in particular, more heat is transmitted using less electricity and working less time,
- the fact that the first zone is obtained with a multilayer that does not have any intermediate layer, ensures the waterproofing of said area and prevents the absorption and stagnation of humidity,
- in the case of using steam irons, the fact that the first zone does not present any intermediate layer, causes the metallized layer to be closer to the iron and to the steam generated by it, thus allowing a reflection of the steam produced by the iron itself, with a consequent formation of a sort of "cushion" of steam above the fabric layer, which makes the movement of the iron more smooth during the ironing operation,
- it is easy to fold up and not bulky,
- allows the iron to be left in the use position for a prolonged time without the element itself being damaged,
- it offers excellent adherence to the ironing surface,
- it allows to iron without undergoing an excessive reverberation of heat and humidity reflected by the ironing surface or by the metal surface,
- it allows to avoid the accumulation of static electricity on the external surface,
- it allows to avoid fires caused by excessive heat,
- it does not present deformation problems in case of exposure to the heat of the iron,
- it allows an optimal smoothness of the iron,
- is stain-resistant, thus allowing to prevent the formation of stains on the clothes during ironing,
- allows to carry out the ironing operations with simplicity, speed and without excessive efforts, and
- is highly customizable.

The invention claimed is:

1. An element (2) for covering an ironing surface (30) comprising:
   a first zone (23) which comprises a multilayer (4) which, in turn, comprises a first upper layer (6) made of fabric, intended to be in contact with or in proximity to the garments to be ironed and/or of an iron (21), and a second underlying layer (8) which is metallized,
   a second zone (11) which comprises at least one layer (12) made of thermally insulating material, so as to define a rest area for temporarily resting a heated plate of the iron (21), and
   a print (39) and/or a sign at an upper/outer surface of said second zone (11) and/or at least another zone (23, 33) which is outside of said second zone (11), the print (39) and/or sign configured to indicate a time interval and/or a time value for which it is ensured that the heated plate of the iron (21) can stop in the second zone (11) without the heated plate itself damaging or deforming said second area.

2. The element (2) according to claim 1, wherein the upper/outer surface of said second zone (11) is visually different from that of the first zone (23).

3. The element (2) according to claim 1, wherein said at least one layer (12) made of thermally insulating material is distinct and different with respect to said second underlying metallized layer (8) of said first zone (23) and/or with respect to said first upper layer (6) in fabric.

4. The element (2) according to claim 1, further comprising, outside the upper/outer surface of said second zone (11) and/or another zone (23, 33) outside of said second zone (11), a further print (38) and/or a further sign to indicate an interval and/or a temperature value for which it is ensured that the heated plate of the iron (21) can rest in correspondence of said second zone (11), substantially at said determined temperature and for that determined interval and/or time value, without the heated plate itself damaging or deforming said second zone (11).

5. The element (2) according to claim 1, wherein said thermally insulating material of said layer (12) of said second zone (11) has an upper/external sliding surface, so as to also allow said second zone (11) to be used for ironing operations.

6. The element (2) according to claim 1, wherein said multilayer (4) also extends in said second zone (11) and in said second zone (11) said layer (12) in thermally insulating material is applied above said first upper layer (6) of said multilayer (4).

7. The element (2) according to claim 1, wherein said multilayer (4) also extends in said second zone (11) and in said second zone (11) said layer (12) of thermally insulating material is provided between said first upper layer (6) and said second underlying layer (8) of said multilayer (4).

8. The element (2) according to claim 1, wherein said second zone (11) is made exclusively of said thermally insulating material (12).

9. The element (2) according to claim 1, wherein said first layer (6) comprises a fabric (20) which is electrically conductive.

10. The element (2) according to claim 1, further comprising a further external layer (22) of outer covering made of oil and/or water-repellent material.

11. The element (2) according to claim 1, further comprising a further inner layer (10) of rubberized material, to increase a contact friction between said element (2) and the underlying ironing surface (30).

12. The element (2) according to claim 11, wherein said further inner layer (10) is provided in a continuous or discontinuous manner at least in correspondence of said first zone (23) below said metallized layer (8) of said multilayer (4).

13. The element (2) according to claim 1, further comprising a third zone (33) comprising an external coating with a lubricating material for lubricating the plate of the iron (21) thus making the ironing action smoother.

14. The element (2) according to claim 1, wherein an underlying continuous membrane (25) which is heat resistant is also associated with the metallized layer (8).

15. The element (2) according to claim 1, further comprising at least an underlying support layer (18) which is intended to be in direct contact with the ironing surface (30).

16. The element (2) according to claim 15, wherein said at least one underlying support layer (18) is made of fleece or needle-punched fibers resistant to temperatures of about 200-250° C.

17. The element (2) according to claim 15, wherein said at least one underlying support layer (18) is provided at said first zone (23) and/or at said second zone (11).

18. The element (2) according to claim 1, wherein said second underlying metallized layer (8) is directly coupled to said first layer (6).

19. The element (2) according to claim 1, wherein said layer (12) made of thermally insulating material is positioned externally and is configured to contact the items to be ironed.

20. The element (2) according to claim 1, wherein said second metallized underlying layer (8) comprises a support polymeric substrate which is coated at the top with a metal foil.

* * * * *